(No Model.)

R. G. PETERS.
LOGGING BOOM SECTION.

No. 549,654.  Patented Nov. 12, 1895.

Witnesses.
Richard L. Frost.
Albert U. Mauzy

Inventor.
Richard G. Peters.
by Geo. R. Ray
his Agent.

UNITED STATES PATENT OFFICE.

RICHARD G. PETERS, OF MANISTEE, MICHIGAN.

LOGGING-BOOM SECTION.

SPECIFICATION forming part of Letters Patent No. 549,654, dated November 12, 1895.

Application filed April 3, 1895. Serial No. 544,350. (No model.)

*To all whom it may concern:*

Be it known that I, RICHARD G. PETERS, of Manistee, in the county of Manistee, in the State of Michigan, have invented certain new and useful Improvements in Logging-Boom Sections; and I do hereby declare that the following is a full, clear, and exact description of the invention, which will enable others skilled in the art to which it appertains to make and use the same.

This invention relates to certain improvements in booms for surrounding floating logs or timber; and the object of my invention is to provide a boom that will prevent the logs from escaping from it in a rough sea; also, to provide a boom the sections of which will not be rolled over by the action of the sea or other cause. I accomplish these objects in the manner shown in the accompanying drawings, in which similar numerals of reference indicate like parts throughout the several views.

Figure 1:
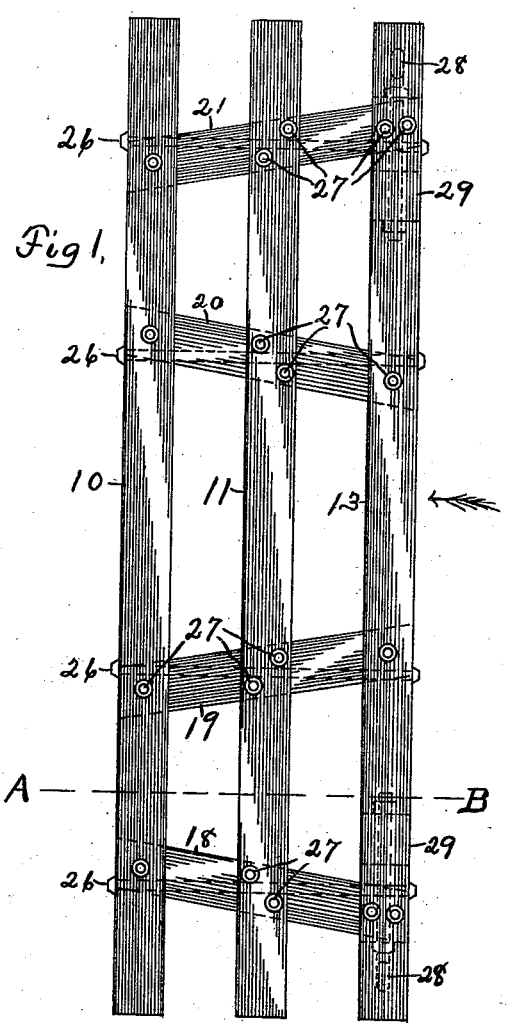
Figure 2:
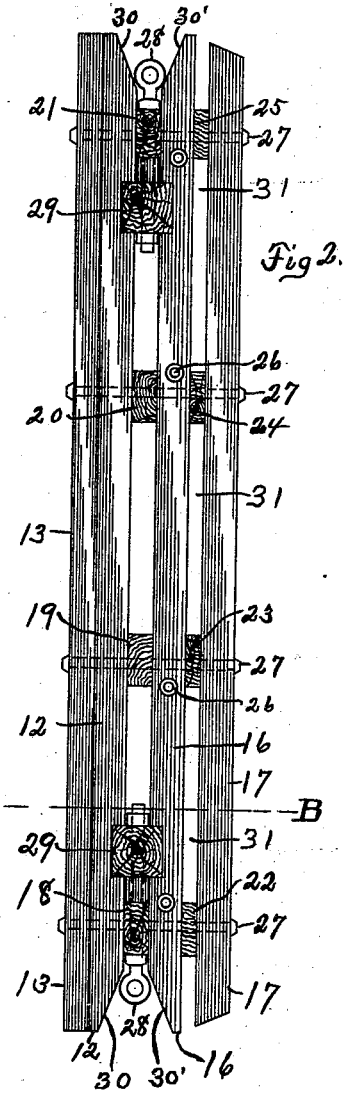
Figure 3:
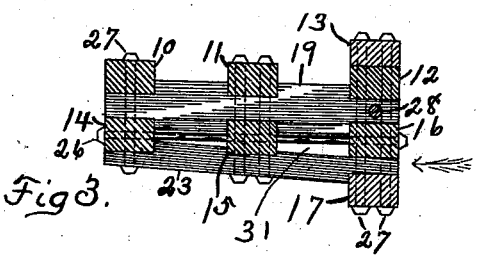

Figure 1 represents a top view or plan of my boom-section. Fig. 2 represents a longitudinal, vertical, or side view of Figs. 1 and 3 and looking in the direction of the arrows. Fig. 3 represents a vertical cross-section of Fig. 1 on the line A B and also a similar section on the line A B of Fig. 2.

Referring to the drawings, numerals 10, 11, 12, 13, 14, 15, 16, and 17 represent large long timbers.

Numerals 18, 19, 20, 21, 22, 23, 24, and 25 represent shorter cross or tie timbers.

Numerals 26 and 27 in Figs. 1, 2, and 3 represent rivets and may be bolts or other satisfactory fasteners employed to securely fasten the several timbers of the boom-sections together. The timbers 10, 11, 12, 13, 14, 15, 16, 17, 18, 19, 20, 21, 22, 23, 24, and 25 are securely fastened together in their respective places by the rivets or bolts 26 and 27, thus forming a boom-section.

Numeral 28 represents eyebolts or other satisfactory coupling-fasteners, to which a chain or rope is attached, so as to couple the boom-sections together.

Numerals 29 represent short blocks of timber let into the timbers 12 and 16 and securely fastened thereto, to which the eyebolts 28 are securely fastened.

The ends of the timbers 12 and 16 at 30 and 30' are cut away to allow the links of the coupling-chain to enter when the ends of the boom-sections come together to prevent breaking or bending of the links of the coupling-chain.

It will be seen that the timbers 10, 11, 12, 14, 15, and 16 are so separated by the cross or tie timbers 18, 19, 20, 21, 22, 23, 24, and 25 that when the boom-section is placed in the water it acts as a raft on the water's surface.

It will be further seen that by securely fastening the timber 13 to the top side of the timber 12 and at the same time fastening the timber 17 to the cross or tie timbers 22, 23, 24, and 25 an inside vertical face will be formed for the imprisoned logs to hit against, as shown in Fig. 2, and also shown by the arrows in Figs. 1 and 3. The water-line of these boom-sections is on or near the line of the eyebolts 28, thus leaving a sufficient inside vertical face portion of the boom-section extending above and below the surface of the water to insure the imprisonment of the logs or timbers within the booms. The distance of this inside vertical face portion above or below the water may be increased by fastening additional timbers to the timbers 13 and 17 or decreased by removing either or both of the timbers 13 and 17. This inside vertical face portion may be covered with iron to prevent the imprisoned logs from chafing it.

The operation of my invention is as follows: Take any number of boom-sections, then by coupling the ends of the boom-sections together by chains through the eyebolts 28 in the respective ends of the boom-sections, and then bringing the two ends of the train of boom-sections together, coupled with coupling-chain, a logging-boom is thus formed in which logs are placed to be towed from place to place in the water, and especially adapted for towing in the great lakes or on the ocean.

My boom-section should be made wide enough to float and remain right side up when out in rough weather.

A boom constructed with boom-sections as shown in my invention will stand a very heavy towing in a rough sea without danger of losing any logs from under or over the boom, as the inside vertical face portion of the boom-sections are kept vertical by the heavy weight of the large timbers of which the boom-sections are composed, and further by amply separating the long timbers so they will form a wide as well as long raft-like boom-section.

The space 31 may be filled with cedar plank to make the boom-section more buoyant.

Having fully described my invention, what I claim, and desire to secure by Letters Patent, is—

The combination, in a floating log-boom section, of the main body made wide like a raft, whereby it retains a horizontal position upon the water, and the inside vertical face made or formed by securely fastening long timbers longitudinally above and below the main body or raft portion at one edge for the purpose of preventing the imprisoned logs from escaping from the boom when in use, substantially as set forth.

RICHARD G. PETERS.

Witnesses:
 GEORGE R. RAY,
 RICHARD L. FROST,
 SAMUEL J. CHAPMAN.